US012558294B2

(12) United States Patent
Coussegal et al.

(10) Patent No.: US 12,558,294 B2
(45) Date of Patent: Feb. 24, 2026

(54) FITTING FOR A FEEDING LINE

(71) Applicant: Vygon, Ecouen (FR)

(72) Inventors: Jean-Louis Coussegal, Beauchamp (FR); Samuel Guilon, Bonneuil-en-France (FR)

(73) Assignee: Vygon (FR)

( * ) Notice: Subject to any disclaimer, the term of this patent is extended or adjusted under 35 U.S.C. 154(b) by 712 days.

(21) Appl. No.: 17/926,280

(22) PCT Filed: May 18, 2021

(86) PCT No.: PCT/FR2021/050867

§ 371 (c)(1),
(2) Date: Nov. 18, 2022

(87) PCT Pub. No.: WO2021/234274

PCT Pub. Date: Nov. 25, 2021

(65) Prior Publication Data

US 2023/0210727 A1 Jul. 6, 2023

(30) Foreign Application Priority Data

May 19, 2020 (FR) ...................................... 2005079

(51) Int. Cl.
*A61J 15/00* (2006.01)

(52) U.S. Cl.
CPC ................................ *A61J 15/0061* (2013.01)

(58) Field of Classification Search
CPC ................ A61J 15/0061; A61J 15/0026; A61J 15/0053; A61J 15/0057;

(Continued)

(56) References Cited

U.S. PATENT DOCUMENTS 5,047,021 A * 9/1991 Utterberg ................ F16L 33/24
604/905
10,420,709 B2 * 9/2019 Davis .................. A61J 15/0026
(Continued)

FOREIGN PATENT DOCUMENTS

JP 2007-512885 A 5/2007
JP 2013-135729 A 7/2013
(Continued)

OTHER PUBLICATIONS

French Preliminary Search Report for Application No. FR 2005079 dated Oct. 19, 2020, 2 pages. [See p. 1, categorizing the cited references].

(Continued)

*Primary Examiner* — Courtney D Heinle
*Assistant Examiner* — Andrew Thanh Bui
(74) *Attorney, Agent, or Firm* — Lerner David LLP

(57) ABSTRACT

The present invention relates to a fitting for an enteral feeding line, comprising: attachment means configured to connect the fitting to a complementary fitting, a tapered tip coaxial with an axis and a flange extending around the tip and coaxial with the tip, the flange extending away from the tip and delimiting with the tip an annular space configured to receive the complementary fitting, the attachment means being disposed at the annular space, the annular space comprising a first portion comprising the attachment means and a second portion not provided with attachment means, the second portion having an axial length along the axis and the tip having a predetermined diameter at an interface I between the first portion and the second portion, a ratio of the predetermined diameter to the axial length being greater than or equal to 1.0 and less than or equal to 2.0.

13 Claims, 3 Drawing Sheets

(58) Field of Classification Search
CPC .......... A61M 2039/1033; A61M 39/10; A61M 2039/1094; A61M 39/1011; A61M 2039/102; A61M 2039/1077; A61M 2039/0009; A61M 2039/1066; A61M 2202/0482; F16L 15/00; F16L 15/001; F16L 15/006; F16L 15/08; F16L 19/00
See application file for complete search history.

(56) References Cited

U.S. PATENT DOCUMENTS

| | | | | |
|---|---|---|---|---|
| 10,682,287 | B2 * | 6/2020 | Davis | A61J 7/0053 |
| 10,744,317 | B2 * | 8/2020 | Davis | A61M 31/00 |
| 2006/0271015 | A1 | 11/2006 | Mantell | |
| 2007/0076401 | A1 | 4/2007 | Carrez et al. | |
| 2008/0287919 | A1 | 11/2008 | Kimball | |
| 2014/0276651 | A1 | 9/2014 | Schultz | |
| 2019/0105484 | A1 | 4/2019 | Doornbos et al. | |
| 2019/0224079 | A1 | 7/2019 | Davis et al. | |
| 2019/0269898 | A1 * | 9/2019 | Pütter | A61M 39/10 |
| 2019/0282794 | A1 | 9/2019 | Carlsson et al. | |

FOREIGN PATENT DOCUMENTS

| | | | |
|---|---|---|---|
| JP | 2016-512117 | A | 4/2016 |
| WO | 2005055919 | A1 | 6/2005 |
| WO | 2019/074619 | A1 | 4/2019 |

OTHER PUBLICATIONS

International Search Report for Application No. PCT/FR2021/050867 mailed Jul. 22, 2021, pp. 1-4.

* cited by examiner

[Fig. 1a]
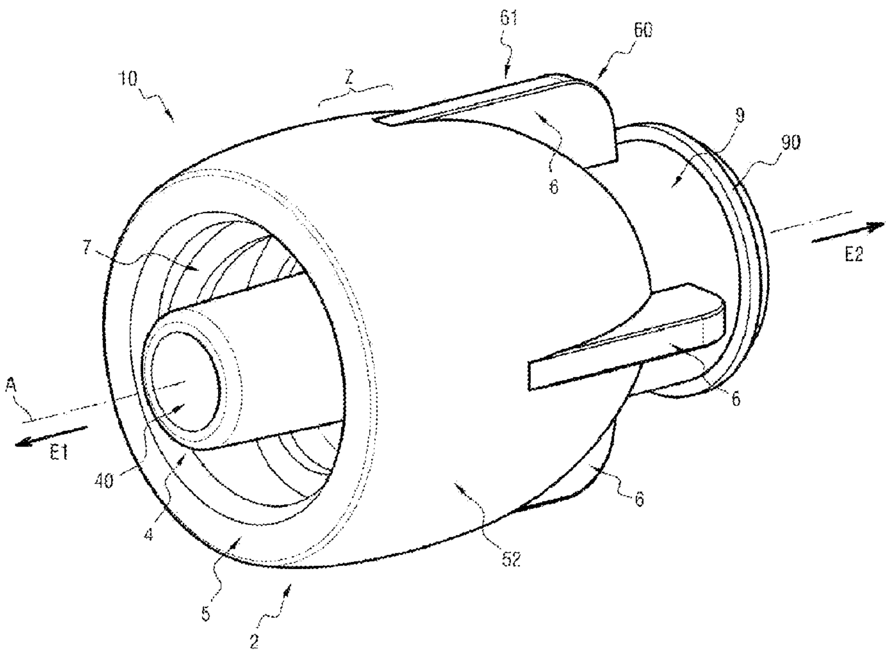
[Fig. 1b]
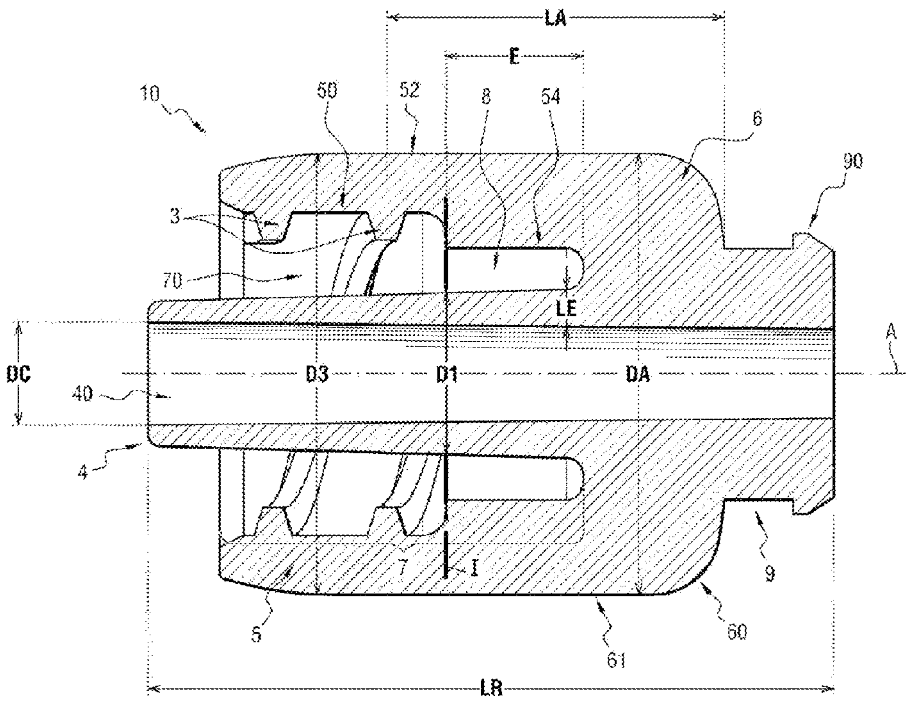

[Fig. 2a]
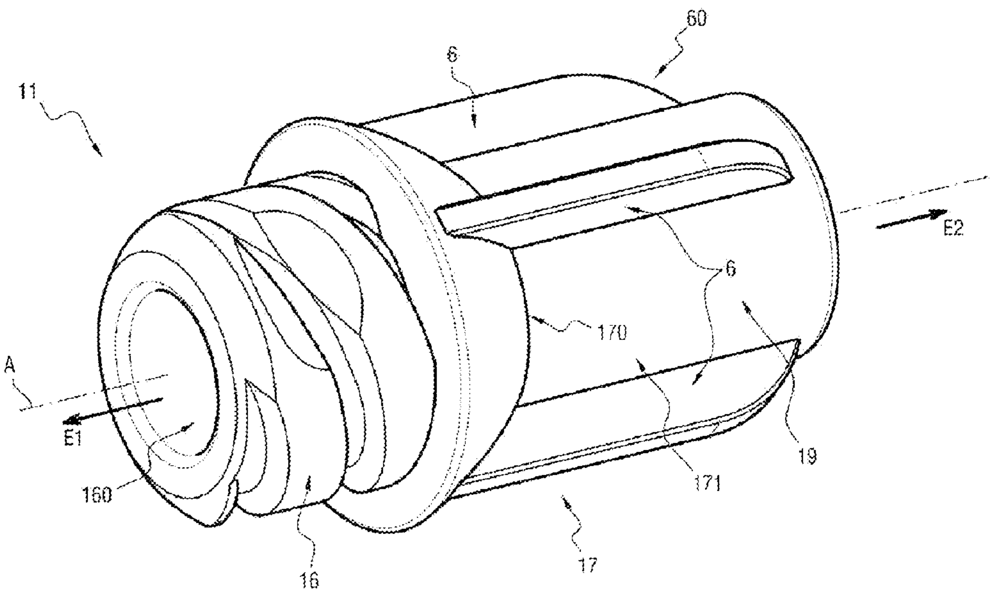
[Fig. 2b]
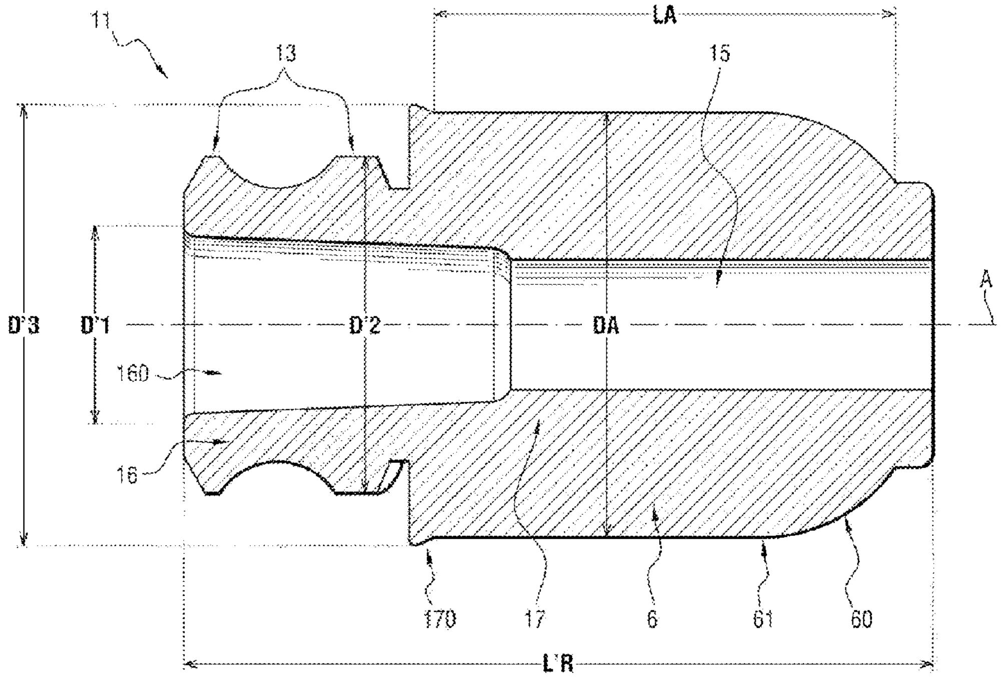

[Fig. 3]
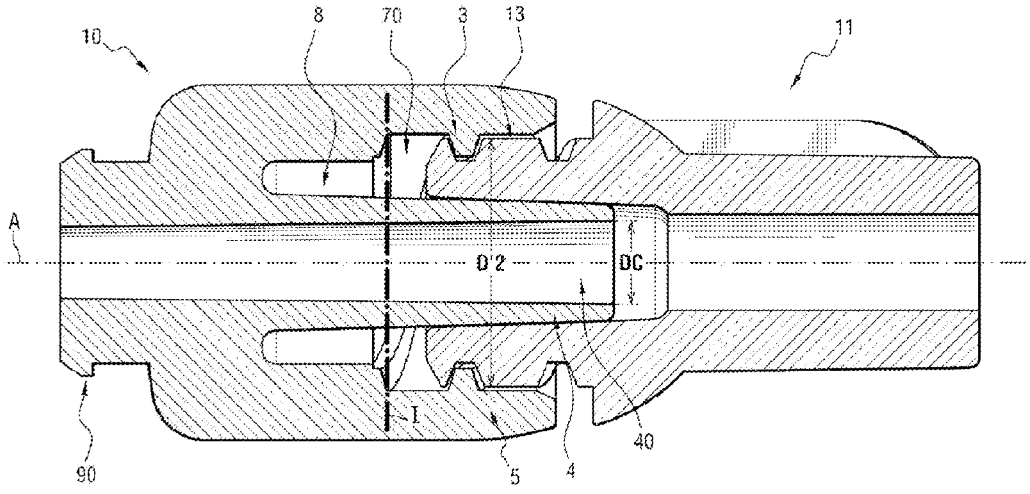

FITTING FOR A FEEDING LINE

CROSS-REFERENCE TO RELATED APPLICATIONS

The present application is a national phase entry under 35 U.S.C. § 371 of International Application No. PCT/FR2021/050867, filed May 18, 2021, which claims priority from French Patent Application No. 2005079 filed May 19, 2020, all of which are incorporated herein by reference.

TECHNICAL FIELD

The present disclosure relates to the field of couplings for making liquid transmission connections in the field of medical devices. The disclosure finds in particular an application in the field of enteral nutrition.

BACKGROUND

The enteral nutrition lines, that is to say that allow providing food to the organism directly in the stomach or the intestines, generally comprise a nutrient container connected to an enteral nutrition tube.

There are known nutrient containers having a male coupling positioned at a container coupling end and enteral nutrition tubes having a female coupling positioned at one end for coupling the tube. The respective couplings of the container and the tube can be fixed directly to each other and locked in the fixed position by threadings.

Document WO 2005/055919 A1 in the name of the Applicant describes several examples of male couplings and female couplings dedicated specifically to enteral nutrition lines. The female coupling has an inlet duct into which a tapered tip of the male coupling can be inserted in a sealed manner. The male coupling for its part has a groove, which extends between the tapered tip and an outer shell. A head of the female coupling, which delimits the inlet duct, can be inserted into the groove. Each of the male and female couplings comprises fixing means in the form of complementary threads so as to lock the male and female couplings.

Furthermore, each of the couplings is dimensioned and designed so that it cannot be accidentally connected to an infusion line coupling, or a catheter coupling. The couplings presented in the aforementioned document therefore limit the risks of supplying an enteral nutrition tube with an inappropriate product for the enteral nutrition, or worse, of supplying a catheter with a product for the enteral nutrition.

However, the Applicant has found that the chemical resistance under stresses of the coupling, in particular when it is a male coupling, tended to break when this coupling was connected for a certain time to the complementary coupling.

Particularly, it appears in use that the male tapered tip of a set of male/female couplings was likely to break when engaging/disengaging with the complementary female coupling. If a user vigorously connects the couplings, a rupture may occur at the base of the male tapered tip.

However, the assembly and disassembly of a nutrition line must be able to be carried out very quickly in hospitals without risk of mechanical rupture, which is therefore not possible with the male and female couplings of the state of the art.

SUMMARY

In view of the foregoing, one aim of the present disclosure is to overcome the drawbacks of the state of the art.

More specifically, one aim of the present disclosure is to propose a coupling, in particular a coupling for an enteral nutrition line, which resists external loads when it is assembled with a complementary coupling.

Another aim is to propose a coupling, in particular a coupling for an enteral nutrition line, which does not break during its assembly/disassembly with a complementary coupling, while meeting the dimensional requirements described in document WO 2005/055919 A1.

Yet another aim is to propose a coupling, in particular a coupling for an enteral nutrition line, which is easy to produce while limiting the risk of occurrence of material defects, and which can be easily connected to a complementary coupling.

According to yet another aim, the desired coupling must have a limited total mass.

To meet these needs, the application relates, according to a first aspect, to a coupling for an enteral nutrition line, the coupling comprising:

- fixing means configured to connect the coupling to a complementary coupling, a tapered tip coaxial with an axis, and
- a flange extending around the tip and coaxial with the tip,
- the flange extending at a distance from the tip and delimiting with the tip an annular space configured to receive the complementary coupling, the fixing means being disposed at the annular space,
- the annular space comprising a first portion comprising the fixing means and a second portion devoid of fixing means, the second portion having an axial length along the axis and the tip having a predetermined diameter at an interface I between the first portion and the second portion,
- a ratio between the predetermined diameter and the axial length being greater than or equal to 1.0 and less than or equal to 2.0.

A coupling as defined above has, optionally and without limitation, the following characteristics taken alone or in any one of the technically possible combinations:

- the flange comprises an inner surface externally delimiting the annular space, the fixing means extending from the inner surface of the flange.
- inner surface of the tip has a diameter at a free end, a ratio between the diameter of the inner surface of the tip and the axial length being greater than or equal to 1.0 and less than or equal to 3.3.
- the ratio between the diameter of the inner surface of the tip and the axial length is greater than or equal to 2.0 and less than or equal to 3.0.
- the coupling has a free end, a coupling end and a total axial length along the axis between the free end and the coupling end, a ratio between the total axial length of the coupling and the axial length of the second portion being greater than or equal to 3 and less than or equal to 6.
- the axial length of the second portion is greater than or equal to 1.8 millimeters and less than or equal to 4.0 millimeters, preferably greater than or equal to 2.0 millimeters and less than or equal to 3.7 millimeters.
- a radial thickness of the tip at the bottom of the annular space is greater than or equal to 0.7 millimeters and less than or equal to 1.2 millimeters, preferably greater than or equal to 0.75 millimeters and less than or equal to 0.90 millimeters.
- the tip has a taper comprised between 5% and 9%, for example equal to 6% or 8%.

the coupling further comprises, at a coupling end, a protruding edge extending radially outwardly and configured to axially block a fixing ring, the protruding edge being preferably annular.

According to a second aspect, the application relates to a connection assembly for an enteral nutrition line, comprising a coupling as defined above and comprising a complementary coupling, the complementary coupling having a tip comprising complementary fixing means of the fixing means, the complementary fixing means extending radially from the tip.

GENERAL DESCRIPTION OF THE FIGURES

Other characteristics, aims and advantages of the invention will emerge from the following description which is purely illustrative and not limiting and which should be read in relation to the appended drawings, among which:

FIG. 1*a* is a perspective view of a male coupling of an enteral nutrition line according to one exemplary embodiment.

FIG. 1*b* is a longitudinal sectional view of the male coupling of FIG. 1*a*, the cutting plane passing through gripping fins of the male coupling.

FIG. 2*a* is a perspective view of a female coupling of an enteral nutrition line according to one exemplary embodiment.

FIG. 2*b* is a longitudinal sectional view of the female coupling of FIG. 2*a*, the cutting plane passing through gripping fins of the female coupling.

FIG. 3 is a longitudinal sectional view of a connection assembly comprising the male coupling of FIG. 1*b* and the female coupling of FIG. 2*b* being connected.

DETAILED DESCRIPTION OF EMBODIMENTS

The detailed description below concerns the example of an enteral nutrition line. It can be a nutrition line comprising a nasogastric tube, an orogastric tube, etc. It will however be understood that the invention can be integrated, with the same advantages, into any other kind of nutrition or infusion line, or into any other liquid transmission connection in the medical field.

Throughout the rest of this description, "free" will designate a part or an end (for example a tip) which is located on the side of connection of the coupling on a complementary coupling, while "coupling" will designate a part or an end which is located on the side where the coupling is fixed on the nutrition line (a bag, a reservoir, etc.). Typically, in the present application, the free end of the male coupling corresponds to its distal end and the coupling end corresponds to its proximal end.

In addition, axis A of a coupling refers to the axis A around which the elements of the coupling 10 are disposed (tip, flange, etc.) which substantially corresponds to an axis of symmetry of the coupling 10. An axial direction corresponds to the direction of the axis A, a radial direction is a direction perpendicular to this axis A and passing therethrough. Furthermore, a circumferential direction corresponds to a direction perpendicular to the axis A and not passing therethrough. Unless otherwise specified, inner (or internal) and outer (or external), respectively, are used with reference to a radial direction so that the inner (or internal) part or face of an element is closer to the axis A than the outer (or external) part or face of the same element.

In all of the appended figures and throughout the description below, similar elements bear identical alphanumeric references.

Enteral Nutrition Line

An enteral nutrition line, for example for use in hospitals, comprises at least one connection assembly comprising a first coupling 10 configured to be connected to a second coupling 11.

The first coupling 10 comprises a tip 4, preferably with a tapered shape, configured to be engaged in an inlet duct 160 of the second coupling 11. In what follows, the first coupling will be designated by male coupling 10 and the second coupling will be designated by female coupling 11, the tip 4 of the male coupling 10 being configured to enter at least partly into the inlet duct 160 of the female coupling 11.

By way of example, the male coupling 10 can be disposed at a coupling end of a nutrient container. The nutrient container comprises for example a bag, a flask, a bottle, a syringe or an enteral nutrition feed hose. The nutrient intended to circulate in the enteral nutrition line comprises for example milk intended for a premature newborn.

The female coupling 11 can for its part be disposed on a coupling end of an enteral nutrition tube. The nutrition tube delivers the nutrient to the patient. This is for example a nasogastric tube or an orogastric tube.

It will be understood that the enteral nutrition line can also include one or several bags, reservoirs, syringes or other liquid delivery or liquid collection instruments, extenders, etc. Several male coupling/female coupling associations can be provided to mount the enteral nutrition line.

The male coupling 10 and the female coupling 11 are for example made of polymer material, preferably by molding.

Coupling

FIG. 1*a* and FIG. 1*b* illustrate a male coupling 10 of an enteral nutrition line according to one exemplary embodiment, respectively in a perspective view and in a longitudinal cutting view along the axis A of the male coupling 10.

The male coupling 10 comprises a head 2 comprising the free end E1 of the male coupling 10 and a body 9 comprising its coupling end E2. The head 2 and the body 9 are coaxial with the axis A. The body 9 extends along the axis A in the continuation of the head 2, up to the coupling end E2 of the male coupling 10.

The head 2 comprises in particular the tapered tip 4 which extends along the axis A, as well as a flange 5 joined with the tip 4. The flange 5 is coaxial with the tip 4, and extends at least partially around the tip 4. The tip 4 extends from the body 9 of the male coupling 10, in the direction of the coupling end E2.

The tip 4 has a truncated cone shape; a large base of the truncated cone of the tip 4 is located towards the coupling end E2, and a small base of the truncated cone of the tip 4 is located towards the free end E1. When appropriate, the tip 4 has a taper comprised between 5% and 9%, for example on the order of 6% or 8%.

Furthermore, the tip 4 defines here, advantageously, a male duct 40 along the axis A. The male duct 40 is opening out on the side of the coupling end E2 as well as on the side of the free end E1, that is to say it allows liquid communication between the coupling end E2 and the free end E1 of the male coupling 10. When the male coupling 10 is connected to the complementary female coupling 11, the male duct 40 thus allows the passage of liquid, for example milk intended for the patient.

Preferably, the free end of the tapered tip 4 extends at a distance from the free end of the flange, so that the tapered tip 4 protrudes along the axis A relative to the annular edge of the flange 5 at the free end E1 of the coupling, as seen in FIG. 1*b*. The flange 5 extends around the tip 4, radially outside and at a distance from the tip 4. The tip 4 and the flange 5 thus define therebetween an annular space 7. The annular space 7 is open at the free end E1 of the male coupling 10 and is configured to receive a head of a complementary female coupling 11.

In particular, the flange 5 has an inner surface 50 facing the tip 4 and an outer surface 52. The annular space 7 is delimited by the inner surface 50 and the tip 4.

In one embodiment, the outer surface 52 of the flange 5 is smooth, that is to say without unevenness or protuberances, in order to facilitate its cleaning and to limit the risks of asepsis.

In the present example, the outer surface 52 is convex, preferably with an ovoid shape. It has been found that this external shape was optimal so as not to risk injuring a patient in case of contact, while remaining simple to manufacture. This is in particular relevant if the male coupling 10 is used in an enteral nutrition line intended for newborns, in particular premature newborns, whose skin is very sensitive.

The annular space 7 comprises a first portion 70 located on the side of the free end E1 as well as a second portion 8 extending in the direction of the coupling end E2 in the continuation of the first portion 70 along the axis A and adjacent to a base of the flange 5.

Fixing means 3 are disposed at the annular space 7. The fixing means 3 are configured to connect the coupling 10 to a complementary female coupling 11.

In one embodiment, the fixing means 3 comprise threads, extending radially towards the annular space 7. The threads 3 of the male coupling 10 are configured to cooperate with complementary threads of the female coupling 11 in order to allow fixing by inserting and locking the male coupling 10 in the female coupling 11. The threads of the male coupling 10 can for example comprise a double thread, each thread extending over a single turn.

As an alternative or in combination, the fixing means 3 can include a bayonet locking means. Here, the locking means can be a female locking means and comprises one or several bent grooves formed in the inner surface 50 of the flange 5 adapted to cooperate with as many male lugs of the female coupling 11.

In the example of FIGS. 1*a* and 1*b*, the threads extend radially inwardly in the first portion 70 of the annular space 7 from the inner surface 50 of the flange 5. The threads thus face the outer surface of the tip 4.

The inner surface 50 of the flange 5 and the outer face of the tip 4 which delimit the second portion 8 of the annular space 7 are preferably devoid of fixing means. In the example illustrated in the figures, the second portion 8 is in the form of a longitudinal annular recess extending along the axis A around the tip 4. In a non-limiting manner, the inner surface 50 of the flange 5 and the outer face of the tip 4 at the second portion 8 can be generally tapered, with a taper smaller than the taper along the first portion 70 of the annular space 7.

The length of the first portion 70 along the axis A, between the annular edge (located at its free end) of the flange 5 and the interface I with the second portion 8, is configured to accommodate the head of a complementary female coupling 11. In one embodiment, when connecting a complementary female coupling 11, no part of the female coupling 11 is housed in the second part 8. In the case of a coupling 10 comprising threads 3, the interface I is located at the bottom of the threads, that is to say at the coupling end of the threads 3.

The second portion 8 extends along the axis A, and has an axial length E between the end on the coupling side of the first portion 70 located at the interface I with the second portion 8 and the end on the coupling side of the second portion 8 (corresponding to the bottom of the recess) comprised between 1.8 millimeters and 4.0 millimeters, preferably between 2.0 millimeters and 3.7 millimeters. Furthermore, D1 denotes the outer diameter of the tip 4, measured at the interface I between the first portion 70 and the second portion 8. The ratio between the outer diameter D1 of the tip 4 and the axial length E of the second portion 8 is greater than or equal to 1.0 and less than or equal to 2.0. In one embodiment, the ratio D1 to E is greater than or equal to 1.1 and less than or equal to 1.8, preferably greater than or equal to 1.2 and less than or equal to 1.3.

The outer diameter D1 of the tip 4 is for example comprised between 3.5 millimeters and 4.0 millimeters (inclusive).

The configuration of the second portion 8, for example in the form of a longitudinal recess, whose length E is at least equal to half the outer diameter D1, has several advantages.

The dimensioning of this second portion 8 allows particularly absorbing the stresses over a larger surface and avoiding shrink marks during the manufacture of the male coupling 10. It further allows increasing the thickness LE of the tip 4 (radial dimension of the tip 4 between its inner surface and its outer surface at the bottom of the annular space 7, at the interface with the coupling radius with the flange 7—see FIG. 1*b*) along the second portion 8, with a constant inner diameter of the tip 4. Thus, the risks of rupture of the tip 4 during assembly or disassembly of the male coupling 10 with a complementary female coupling 11 are reduced, as opposed to the male couplings of the state of the art whose chemical resistance under stresses was lower over time and likely to break at the base of the tip.

DC denotes the diameter of the inner surface of the tip 4, measured at the free end of the tip 4 (see FIG. 1*b*). In one embodiment, the ratio between the inner diameter DC of the tip 4 and the thickness LE is comprised between 1.0 and 3.3 (inclusive), preferably between 2.0 and 3.0.

For example, the thickness LE of the tip 4 measured at the base of the cone of the second portion 8 can be comprised between 0.7 millimeters and 1.2 millimeters (inclusive), preferably between 0.75 millimeters and 0.90 millimeters (inclusive), for an inner diameter of the tip 4 comprised between 1.2 millimeters and 2.3 millimeters (inclusive), preferably between 2.1 millimeters and 2.2 millimeters (inclusive). Typically, the thickness LE of the tip 4 can be equal to 0.86 millimeters for an inner diameter DC equal to 2.2 millimeters.

Furthermore, the dimensioning of the second portion 8 of the annular space, between the tip 4 and the flange 5, creates a radial clearance when assembling the male coupling 10 with a complementary female coupling 11. The flange 5 but also the tip 4 thus have more radial flexibility than the flanges and tips of the couplings of the state of the art, which facilitates the assembly of the couplings 10, 11 and limits the radial stresses undergone by the coupling in use.

Finally, such a dimensioning of the second portion 8 of the annular space 7 allows limiting the material defects during the manufacture of the male coupling 10, and in particular avoiding shrink marks when cooling the material constituting the coupling.

This dimensioning of the tip 4 and of the annular space 7 thus allows significantly improving the resistance of the male coupling 10, particularly its resistance under stresses, and improving the radial clearance during assembly with the complementary female coupling 11. The head 2 and/or the body 9 of the male coupling 10 can further be lengthened along the axis A relative to the male couplings of the prior art, without excessively increasing the mass of the coupling 10.

Here, the total axial length LR of the male coupling 10 between the coupling end E2 and the free end E1 is preferably comprised between 10 millimeters and 20 millimeters (inclusive), for example on the order of 15 millimeters. The total axial length LR of the coupling is preferably between three times and six times greater than the axial length E of the second portion 8 along the axis A.

Finally, the maximum outer diameter D3 of the male coupling 10 is preferably comprised between 5 millimeters and 7 millimeters (inclusive). This maximum diameter D3 is here reached at the head 2 of the male coupling 10.

Advantageously, to facilitate the handling of the male coupling 10, the male coupling 10 has one or several gripping fins 6.

The fins 6 extend radially outwardly from the head 2 of the male coupling 10.

In the present example, the fins 6 extend from the outer surface 52 of the flange 5 on the side and extend axially up to the body 9.

In one embodiment, the number of fins 6 of the male coupling 10 is comprised between two and four in order to facilitate the cleaning of the male coupling 10 and to limit the risks of asepsis, while guaranteeing a good grip by an operator. In the exemplary embodiment illustrated in the figures, the male coupling 10 comprises four fins.

The fins are preferably distributed evenly and circumferentially about the axis A. When the number of fins 6 is even, the fins 6 are opposed in pairs. Preferably, all the gripping fins 6 are identical in shape.

Thanks to the gripping fins 6 provided on the head 2 of the male coupling 10, the male coupling 10 is easier to grasp and handle, whether or not it is engaged with a complementary female coupling 11. In particular, the fins 6 facilitate the handling of the male coupling 10 by an automatic assembly machine. The male coupling 10 can be easily grasped with a gripper of the automatic assembly machine.

The center of gravity of the male coupling 10 is furthermore stabilized due to the presence of the gripping fins 6. The selection of the male coupling 10, by a distributor of the assembly machine, is facilitated.

Another advantage of the gripping fins 6 is to facilitate the verification of the rotation of the coupling, during the assemblies by an automatic assembly machine. The verification can be carried out with proximity sensors.

In the present example, each fin 6 comprises two opposite and substantially parallel side surfaces extending radially from the outer surface 52 of the flange 5. The two side surfaces are connected at their external radial end by an axial edge 61 and at their end on the coupling side by a radial edge 60. The thickness (circumferential dimension, between the side surfaces) of the fins is reduced, for example on the order of 1 millimeter.

The outer surface 52 of the head 2, which here has an ovoid shape, comprises an area Z of maximum diameter. This area Z is here located in the vicinity of the free annular edge of the flange 5. In one embodiment, each fin 6 extends axially from this area Z and maintains a constant distance relative to the axis A until approaching the axis A at a radial edge 60 to join the body 9. In other words, the axial edge 61 of the fins 6 extends at a substantially constant distance from the axis A up its radial edge 60.

In one embodiment, the junction between the axial edge 61 and the radial edge 60 is rounded. A radius of curvature of this junction is for example comprised between 0.5 millimeters and 2.0 millimeters (inclusive). In this way, the fin does not have any sharp angle, thus avoiding any risk of injuring the skin or the mucous membranes of patients upon contact with the male coupling 10.

The fin 6 and in particular the rounded junction between its edges is produced directly during the molding of the male coupling 10.

In order to further limit the risks of injury to patients, the radial extension of the fins 6 is limited. More specifically, by noting DA the maximum radial dimension between the axial edges of two opposite fins along an axis radial to the axis A, the radial dimension DA is at most equal, to within 0.1 millimeter, to the maximum diameter D3 of the head 2. In other words, the fins 6 project a maximum of 0.1 millimeter relative to the rest of the head 2, to avoid scratching the skin or the mucous membranes of the patients in case of contact. In the orientation of FIG. 1*b*, the radial dimension DA extends along a vertical direction.

In one embodiment, the radial dimension DA and the maximum diameter D3 are equal. In this way, the risks of injury to patients are limited while guaranteeing good gripping of the fins 6 by an operator.

The axial length LA of each gripping fin 6, between its anchoring area on the outer surface 52 and its radial edge 60, is preferably comprised between 30% and 80% of the total axial length LR of the coupling, preferably between 40% and 70%. It is recalled that the total axial length LR is taken along the axis A, between the coupling end E2 and the free end E1. The gripping fins 6 thus project radially from the head 2, and have side surfaces of sufficient surface area to allow good gripping by a person or by an automatic assembly machine.

Finally, with regard to the body 9 of the male coupling 10 located at the coupling end E2, this body 9 can have a generally cylindrical shape. The diameter of this cylinder is smaller than the maximum diameter D3 of the flange 5. When appropriate, the outer surface of the body 9 is cylindrical of revolution.

The body 9 forms the fixing part of the male coupling 10 with a nutrient container, a tubing, an extender, etc.

The body 9 preferably includes, at the coupling end E2, a protruding border 90. The border 90 protrudes relative to the side surface of the body 9.

The border 90 is configured to axially block a fixing ring. In particular, the border 90 can be used to engage one tab cap end. The tab cap can have, at the other end, an obturation tip to reclose the nutrition line.

Here, the border 90 comprises a planar radial surface facing the flange 5 and is chamfered on the coupling side in order to facilitate the engagement of the fixing ring. Following its mounting, the fixing ring comes into abutment against the planar radial face of the border 90.

Preferably, the border 90 is annular and continuous over the entire circumference of the body 9. Alternatively, the border 90 is discontinuous and comprises one or several angular sectors extending circumferentially around the body 9.

In one embodiment, the fins 6 extend at a distance from the border 90, so as to allow fixing a fixing ring.

Female Coupling

FIG. 2*a* and FIG. 2*b* illustrate a female coupling 11 of an enteral nutrition line according to one exemplary embodiment, respectively according to a perspective view and according to a longitudinal sectional view along an axis of extension of the female coupling 11. The female coupling 11 being configured to receive the male coupling 10, the axis of extension of the female coupling 11 is coincident with the axis A.

In the present example, the female coupling 11 is further configured to be partially housed in the male coupling 10. More specifically, the first head portion 16 of the female coupling 11 is configured to be partially housed in the annular space 7 defined by the tip 4 and the flange 5 of the male coupling 10 when they are connected.

Like the male coupling 10 described above, the female coupling 11 comprises a head comprising the free end E1 of the female coupling 11 and a body 19 comprising its coupling end E2. The head and the body 19 are coaxial with the axis A and both extend along the axis A.

The head of the female coupling 11 includes a tip 16, positioned at the free end E1, and a flange 17, located in the continuation of the tip 16 in the direction of the free end E1 of the female coupling 11. The tip 16 has an outer diameter smaller than the outer diameter D'3 of the flange 17.

The tip 16 of the head comprises fixing means 13.

In the present example, the fixing means 13 comprise threads extending radially from the outer surface of the tip 16 and configured to cooperate with the threads of the fixing means 3 of the male coupling 10. As an alternative or in combination, the fixing means of the female coupling 11 can include a bayonet locking means, or any other sealed and fixed fixing means. For example, the locking means can be a male locking means and comprises one or several male lugs extending from the outer surface of the tip 16 and adapted to cooperate with as many female bent grooves of the male coupling 10.

In the present example, the tip 16 has a double thread, each thread extending over one turn, as seen in FIG. 2*b*.

Advantageously, the outer diameter of the tip 16 of the head is strictly smaller than the internal diameter of the inner surface 50 of the flange 5 of the male coupling 10 at the interface I.

The tip 16 defines the inlet duct 160 of the female coupling 11. The inlet duct 160 has a shape complementary to that of the tip 4 of the male coupling 10.

In the present example, the tip 16 thus has the shape of a truncated cone, configured to receive the tip 4 of the male coupling 10. When appropriate, the tip 16 has a taper equal to the taper of the male tip 4, typically comprised between 5% and 9%, for example on the order of 6% or 8%.

The tip 16 is configured to receive the part of the tip 4 which extends inside the first portion 70 of the annular space 7. An internal diameter D'1 of the tip 16 is thus greater than the outer diameter D1 of the tip 4. Furthermore, when the tip 4 of the male coupling 10 is inserted into the inlet duct 160, the tip 16 is itself housed in the annular space 7 defined by the tip 4 and the flange 5.

The complementarity in shape between the tip 16 of the female coupling 11 and the head 2 of the male coupling 10 is illustrated in FIG. 3. This figure represents, in longitudinal sectional view, the connection assembly formed by the male coupling 10 and the female coupling 11 being connected. By "being connected" is meant that the fixing means 3 of the male coupling 10 are at least partially engaged with the fixing means 13 of the female coupling 11, so that the two couplings 10, 11 are connected to each other.

As can be seen in FIG. 3, the tip 16 is shaped to extend into the second portion 70 of the annular space 7, without however reaching the second portion 8 in the form of a longitudinal recess.

Returning to FIGS. 2*a* and 2*b*, the flange 17 has here, on the free side (on the left according to the orientation of FIG. 2*b*), a flat side which extends radially outwardly from the tip 16.

D'3 denotes the maximum outer diameter of the flat side of the flange 17. The diameter D'3 is greater than the outer diameter D'2 of the tip 16.

On the free side, the flange 17 comprises an external surface 170. The external surface 170 of the flange 17 here has an ovoid shape. In one embodiment, the external surface 170 is configured to extend in the continuation of the outer surface 52 of the flange 5 when the male coupling 10 and the female coupling 11 are connected, which reduces the protruding surfaces and therefore limits the risks of injury to the patient. When appropriate, when the couplings 10, 11 are connected, the flat side of the flange 17 of the female coupling comes into abutment against the annular edge of the flange 5 of the male coupling 10.

Finally, concerning the body 19 located on the free side of the female coupling 11, the latter is preferably of cylindrical shape and has an outer diameter smaller than the outer diameter D'3 of the external surface 170 of the head.

The body 19 defines a continuation duct 15. This continuation duct 15, which is not necessarily provided to cooperate with part of the male coupling 10, is located in the continuation of the tip 16 along the axis A. Thus, liquid can circulate inside the female coupling 11 between the free end E1 and the coupling end E2. The continuation duct can be cylindrical.

When appropriate, a radial narrowing takes place at an interface between the inlet duct 160 and the continuation duct 15.

In the illustrated exemplary embodiment, the periphery of the body 19 of the female coupling 11 is here not provided with a border protruding relative to the side surface of the body, provided for the axial blocking of a fixing ring. This is however not limiting, such a protruding border being able to be added when appropriate, to cooperate for example with a tab cap.

It will be noted that all of the characteristics described for the male 10 apply mutatis mutandis to the female coupling 11. Particularly, the female coupling 11 can comprise one or several gripping fins 6.

Each fin 6 extends radially from the head of the female coupling 11, from the flange 17 to the body 19.

Analogously to the fins 6 of the male coupling, the radial extension of the fins 6 is limited so that the coupling remains atraumatic for the patients. Thus, the maximum radial dimension DA between two opposite fins 6 is at most equal (within 1 millimeter) to the maximum diameter D'3 of the external surface 170 (corresponding here to the diameter of the flange 17 at the flat side). In other words, the fins 6 project a maximum of 0.1 millimeter relative to the rest of the head, to avoid scratching the skin or the mucous membranes of the patients in case of contact.

In one embodiment, the maximum diameter D'3 is comprised between 4.5 millimeters and 6.5 millimeters (inclusive).

In the present example, the radial dimension DA of the fins 6 is smaller than the maximum diameter of the flange 17, so that the axial edges of the fins 6 are radially set back relative to the external surface 170 of the flange 17.

Preferably, all the gripping fins 6 are identical in shape. Here, each fin 6 has a shape similar to the shape of the fins of the male coupling, with two opposite side surfaces extending radially from the head, connected together by an axial edge 61 and a radial edge 60 coupled by a rounded junction.

The fins 6 are positioned axially at a distance from the fixing means 13. In the example of the female coupling 11 of FIGS. 2*a* and 2*b*, the flat side of the flange 17 separates the fixing means 13 and the fins 6.

Thanks to the gripping fins 6, the female coupling 11 is easier to grasp and handle by a person or by an automatic assembly machine, whether the coupling is engaged or not with a complementary coupling.

The optional characteristics presented above, with reference to the male coupling 10 of FIGS. 1*a* and 1*b*, are also valid for the gripping fins of the female coupling 11.

Particularly:

- the number of gripping fins is comprised between two and four;
- the fins are distributed evenly and circumferentially about the axis A;
- the axial length LA of each gripping fin, from its anchoring area on the external surface 170 of the flange 17 up to its radial edge 60, is comprised between 30% and 80% of the total axial length L'R of the female coupling 11 between the coupling end E2 and the free end E1, preferably between 40% and 70%.

The total length L'R of the female coupling 11 is for example comprised between 10 millimeters and 20 millimeters (inclusive), for example 15 millimeters.

The radius of curvature R of the junction between the axial edge 61 and the radial edge 60 of each gripping fin 6 is preferably comprised between 0.5 millimeters and 2.0 millimeters (inclusive), always to ensure that the coupling remains atraumatic for the skin and the mucous membranes of the patient.

The connection assembly formed by the male coupling 10 and the female coupling 11 described above combines great ease of use, thanks to the gripping fins 6 making the assembly and the disassembly easier, and great reliability since the risk of mechanical rupture at the tapered tip of the male coupling is significantly limited during the assembly and the disassembly.

Furthermore, the couplings 10, 11 can be manufactured in large numbers while ensuring manufacturing quality control; the gripping fins 6 facilitate the transport of the couplings 10, 11 by an automatic assembly machine, and the shape described above for the annular space of the male coupling 10 allows avoiding shrink marks at the head of the male coupling 10.

The enteral nutrition line couplings described above are therefore more suitable for a mass use in hospitals than the couplings of the state of the art.

The invention claimed is:

1. A coupling for an enteral nutrition line, the coupling comprising:

- fixing means configured to connect the coupling to a complementary coupling;
- a tapered tip coaxial with an axis; and
- a flange extending around the tapered tip and coaxial with the tapered tip,
- the flange extending at a distance from the tapered tip and delimiting with the tapered tip an annular space configured to receive the complementary coupling, the fixing means being disposed at the annular space;
- the annular space comprising a first portion comprising the fixing means and a second portion devoid of fixing means, the second portion having an axial length along the axis and the tapered tip having a first diameter at an interface between the first portion and the second portion;
- wherein a ratio between the first diameter and the axial length is greater than or equal to 1.0 and less than or equal to 2.0.

2. The coupling according to claim 1, wherein the flange comprises an inner surface that surrounds the annular space, the fixing means extending from the inner surface of the flange.

3. The coupling according to claim 1, wherein an inner surface of the tapered tip has a second diameter at a free end, a ratio between the second diameter of the inner surface of the tapered tip and the axial length being greater than or equal to 1.0 and less than or equal to 3.3.

4. The coupling according to claim 3, wherein the ratio between the second diameter and the axial length is greater than or equal to 2.0 and less than or equal at 3.0.

5. The coupling according to claim 1, wherein the coupling has a free end, a coupling end and a total axial length along the axis between the free end and the coupling end, a ratio between the total axial length of the coupling and the axial length of the second portion being greater than or equal to 3 and less than or equal to 6.

6. The coupling according to claim 1, wherein the axial length of the second portion is greater than or equal to 1.8 millimeters and less than or equal to 4.0 millimeters.

7. The coupling according to claim 1, wherein a radial thickness of the tapered tip at a bottom of the annular space is greater than or equal to 0.7 millimeters and less or equal to 1.2 millimeters.

8. The coupling according to claim 1, wherein the tapered tip has a taper comprised between 5% and 9%, for example equal to 6% or 8%.

9. The coupling according to claim 1, further comprising a protruding edge at a coupling end, wherein the protruding edge extends radially outwardly and is configured to axially block a fixing ring.

10. A connection assembly for an enteral nutrition line, comprising a coupling according to claim 1 and a complementary coupling, the complementary coupling having a tip comprising complementary fixing means of configured to engage the fixing means so as to connect the coupling and the complementary coupling, the complementary fixing means extending radially from the tip.

11. The coupling according to claim 1, wherein the axial length of the second portion is greater than or equal to 2.0 millimeters and less than or equal to 3.7 millimeters.

12. The coupling according to claim 1, wherein a radial thickness of the tapered tip at a bottom of the annular space is greater than or equal to 0.75 millimeters and less than or equal to 0.90 millimeters.

13. The coupling according to claim 9, wherein the protruding edge is annular.

* * * * *